US006230094B1

(12) United States Patent
Ohashi et al.

(10) Patent No.: US 6,230,094 B1
(45) Date of Patent: May 8, 2001

(54) ELECTRONIC CONTROL SYSTEM AND METHOD HAVING MONITOR PROGRAM

(75) Inventors: Hideyuki Ohashi, Toyota; Kuraji Kato, Chita-gun; Hiroshi Shibata, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/262,348

(22) Filed: Mar. 4, 1999

(30) Foreign Application Priority Data

Apr. 13, 1998 (JP) .................................................. 10-101127

(51) Int. Cl.[7] .............................. F02D 41/22; G05B 9/02
(52) U.S. Cl. ...................... 701/107; 701/114; 123/396; 700/4; 700/81
(58) Field of Search ..................................... 701/107, 114, 701/110, 31; 123/396; 700/3, 4, 81

(56) References Cited

U.S. PATENT DOCUMENTS 4,532,594 * 7/1985 Hosaka et al. ........................ 701/114
4,558,416 * 12/1985 Pauwels et al. ...................... 701/114
5,880,568 * 3/1999 Bederna et al. ...................... 318/563

FOREIGN PATENT DOCUMENTS

| 5-81222 | 4/1993 | (JP) . |
| 6-83659 | 3/1994 | (JP) . |
| 6-274468 | 9/1994 | (JP) . |

* cited by examiner

Primary Examiner—Andrew M. Dolinar
(74) Attorney, Agent, or Firm—Nixon & Vanderhye P.C.

(57) ABSTRACT

An electronic control system has an engine control computer and a throttle control computer. The engine control computer has a monitor program separate from an engine control program. The monitor program is for checking the operation of the throttle control computer and executed by the engine control computer as a timer interrupt routine. A watch dog timer is connected to the engine control computer to detect malfunction of the monitor program in response to a watch dog pulse produced during the execution of the monitor program. The watch dog timer disables an electronic throttle control by the throttle control computer upon detection of the malfunction of the monitor program. At the same time, the engine control mode is changed from a normal engine control to an engine power reduction control thereby to ensure a limp-home operation of the engine.

23 Claims, 6 Drawing Sheets

ELECTRONIC CONTROL SYSTEM AND METHOD HAVING MONITOR PROGRAM

CROSS REFERENCE TO RELATED APPLICATION

This application relates to and incorporates herein by reference Japanese Patent Application No. 10-101127 filed on Apr. 13, 1998.

BACKGROUND OF THE INVENTION

1. Field of the Invention

The present invention relates to an electronic control system which is capable of detecting a computer malfunction by monitoring operations of a plurality of computers with respect to each other.

2. Related Art

Electronically-controlled throttle devices, which drive throttle valves by electric motors, are used recently in automotive vehicles. JP-A-6-83659 discloses a method of detecting malfunction of microcomputer (computer) for such electronically-controlled throttle devices. According to this malfunction detection method, a plurality of computers communicate and compare each other's various calculation data and A/D conversion data, which are produced in each computer in the same calculation and A/D conversion processing, so that the computer malfunction may be detected based on the comparison of data.

It is, however, impossible to determine which one of the computers are in failure when two computers is used in the system. Therefore, both computers will have to be disabled for a fail-safe operation upon detection of the malfunction.

For instance, recent electronic control systems for engines use a computer for a throttle control as well as a computer for an engine control (spark ignition and fuel injection control). In those systems, even if only the computer for the throttle control fails, both computers have to be disabled to control the spark ignition and fuel injection. As a result, a limp-home operation is not sufficiently ensured.

To overcome the above disadvantage, an additional computer for monitoring other computers may be used, or a watch dog timer (WDT) may be added to the engine control computer. The additional computer will add cost. Further, the engine control computer will not be able to detect the malfunction of a monitor program of the throttle control computer by only the watch dog timer of the engine control computer in the event that only the monitor program of the throttle control computer fails.

SUMMARY OF THE INVENTION

It is therefore an object of the present invention to provide an electronic control system, which is capable of obviating the above problem.

It is a further object of the present invention to provide an electronic control system, which is capable of attaining a limp-home operation of an engine control computer even when a throttle control computer has a malfunction.

According to the present invention, a first computer is designed for controlling a first object such as a throttle driving motor, and a second computer is designed for controlling a second object such as a fuel injection or ignition timing of an engine. The second computer has a monitor program for monitoring operation of the first computer. The second computer executes the monitor program as a timer interrupt routine, which interrupts another routine such as an engine control program. The second computer produces a watch dog pulse during the execution of the monitor program. A watching unit is connected to the second computer to detect a malfunction of the monitor program from the watch dog pulse. The watching unit disables the throttle driving motor control and at the same time applies a malfunction signal to the first computer, which in turn transmits it to the second computer. The second computer changes its engine control mode from normal control to a power reduction control, thereby ensuring a limp-home operation of the engine without throttle control by the first computer.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

An electronic control system of the present invention will be described in detail with reference to an embodiment, which is directed to an engine system using a throttle control computer and an engine control computer.

Figure 1:
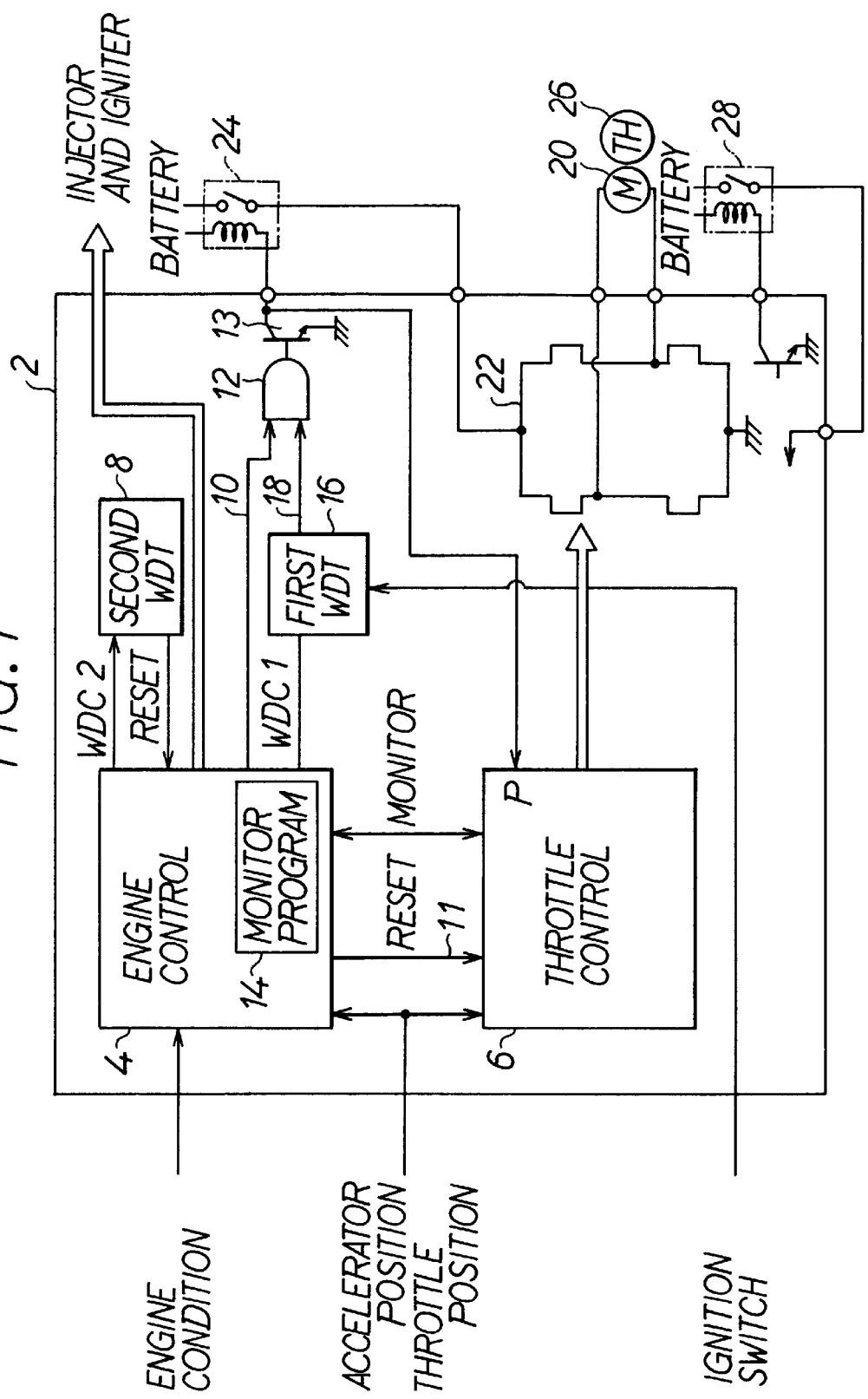
FIG. 1 is a block diagram showing an electronic control system for engines according to an embodiment of the present invention.

As shown in FIG. 1, the electronic control system has an electronic control unit (ECU) 2, which is equipped with an engine control microcomputer (computer) 4 and a throttle control microcomputer (computer) 6. The ECU 2 is rendered operative by the electric power supplied from a battery (not shown) through a main relay 28.

The engine control computer 4 receives an accelerator position signal, throttle position signal and other engine condition signals such as a rotation speed signal, calculates required ignition timing and fuel injection amount based on the received signals, and produces control signals to a spark ignition device (igniter) and fuel injection device (injector) in the known manner.

The engine control computer 4 has a monitor program 14 to be executed for monitoring operation of the throttle control computer 6, in addition to a base routine program to be executed for controlling the ignition timing and fuel injection. The engine control computer 4 is programmed to execute the monitor program 14 as a periodic interrupt routine independently of the base routine.

The engine control computer 4, in executing the monitor program 14, compares results of calculation made on the same data by the engine control computer 4 and the throttle control computer 6, and detects the malfunction of the throttle control computer 6 when the compared calculation results differ from each other. The engine control computer 4 produces a low level signal (L) indicative of the malfunction of the throttle control computer 6 to an AND gate 12 through a signal line 10.

The engine control computer 4 may also be programmed to produce a reset signal to the throttle control computer 6 through a signal line 11 to reset the same, when the malfunction occurs in the throttle control computer 6.

The engine control computer 4 is programmed to produce a watch dog pulse WDC1 from the monitor program 14. A first watch dog timer (WDT) 16 is connected to the engine control computer 4 to receive the watch dog pulse WDC1. A signal from an ignition switch is also applied to the first watch dog timer 16. The first watch dog timer 16 detects malfunction in the execution of monitor program 14 based on the received signals. When the malfunction in execution of the monitor program 14 is detected, the first watch dog timer 16 produces a low level signal (L) indicative of the malfunction of the monitor program 14 to the AND gate 12 through a signal line 18. The AND gate 12, in response to the signals from the monitor program 14 and the first watch dog timer 16, controls a normally-closed type motor relay 24, which supplies electric power from the battery to a motor drive circuit 22. The motor drive circuit 22 is in turn connected to an electric motor 20, which is coupled with a throttle valve 26. The motor drive circuit 22 is connected to the throttle control computer 6, which controls the electric motor 20 through the motor drive circuit 22 in response to signals indicative of the accelerator position and throttle position.

The AND gate 12 produces a high level signal (H) when both of the received signals are at the high level (H). However, it produces a low level signal (L) when either of the received signals is at the low level (L) indicative of malfunction. Thus, whenever the malfunction occurs in the engine control computer 4, the AND gate 12 turns off the motor relay 24 to render the drive circuit 22 and the electric motor 20 inoperative. As a result, the throttle valve 26 is disabled to control the amount of intake air supplied to an engine.

The motor relay 24 is connected to a port P of the throttle control computer 6 so that the throttle control computer 6 receives a signal indicative of the malfunction represented by the low level signal (L) of the AND gate 12.

The engine control computer 4 is programmed to produce a watch dog pulse WDC2 to a second watch dog timer (WDT) 8 as long as operating properly, so that the second watch dog timer 8 may monitor the operation of the engine control computer 4 based on the received watch dog pulse WDC2. The second watch dog timer 8 produces a reset signal to the engine control computer 4 to reset the same, when the second watch dog timer 8 detects the malfunction of the engine control computer 4.

Figure 2:
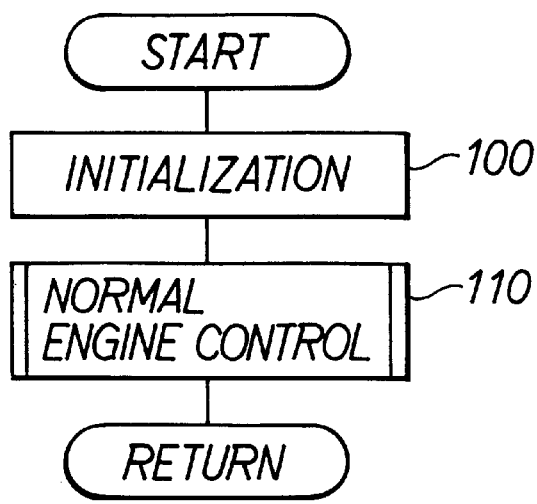
FIG. 2 is a flow diagram showing a base routine executed by an engine control computer used in the embodiment.
Figure 3:
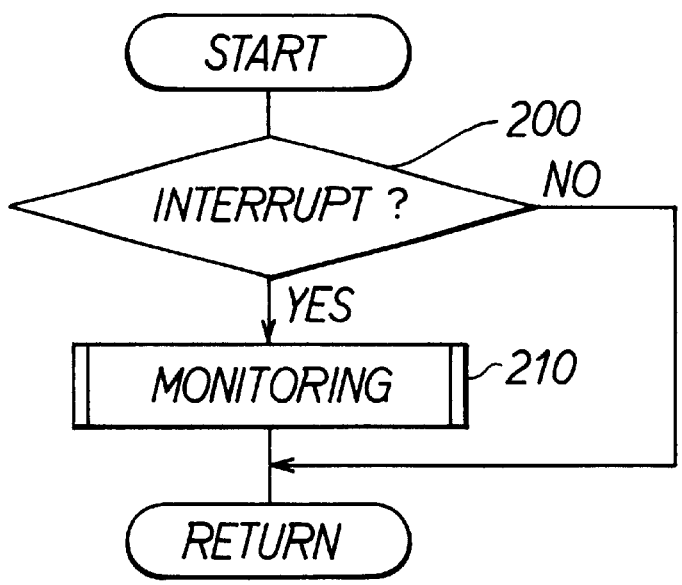
FIG. 3 is a flow diagram showing an interrupt routine executed by the engine control computer.

The engine control computer 4 is programmed to execute a base routine shown in FIG. 2 and an interrupt routine shown in FIG. 3.

As shown in FIG. 2, after power-on of the ECU 2, the engine control computer 4 executes an initialization processing at step 100 and engine control processing at step 110 to control the injector and the igniter. This routine is known well in the art.

As shown in FIG. 3, the engine control computer 4 starts the interrupt routine at a predetermined fixed time interval even when the base routine shown in FIG. 2 is being executed. The engine control computer 4 checks at step 200 whether an interrupt processing is allowed. The processing advances to step 210 to execute monitor processing in response to an affirmative determination (Y), while it ends this routine in response to a negative determination (N). The monitor processing at step 210 is for checking computer malfunction by the monitor program 14 shown in FIG. 4.

Figure 4:
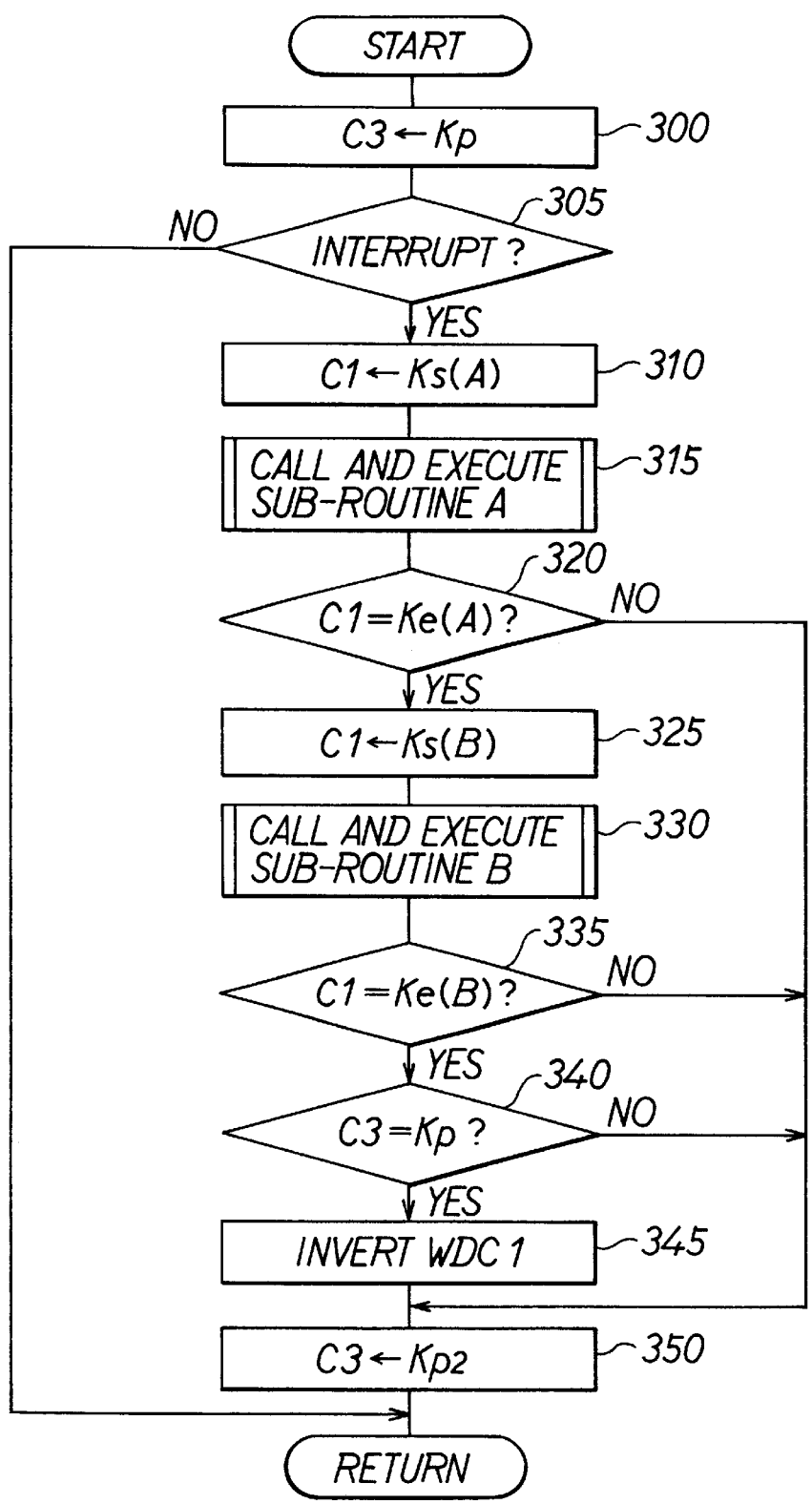
FIG. 4 is a flow diagram showing the detail of a monitor program executed in the interrupt routine.

As shown in FIG. 4, the engine control computer 4 first stores a predetermined value Kp in C3 at step 300. This C3 is an entry/end check RAM of the monitor program 14, which is used for checking whether the execution of the monitor program 14 is started and ended properly. After step 300, the engine control computer 4 checks at step 305 whether interrupt processing is allowed. The processing advances to step 310 in response to an affirmative determination (Y), while it ends in response to a negative determination (N).

At step 310, a predetermined value Ks(A)indicative of entry into the sub-routine A is stored in C1. This C1 is a sub-routine processing order check RAM thereby to check whether a plurality of sub-routines in the monitor program 14 are executed in the predetermined order. Next, the sub-routine A is called in and executed at step 315.

The engine control computer 4 then checks at step 320 whether C1 is equal to Ke(A), which is to be set at the time of ending the sub-routine A. The processing advances to step 350 in response to a negative determination (N) indicative of the malfunction in the monitor program 14, that is, improper processing order of the sub-routine A, without executing steps 325 to 345. The step 345 is for inverting the watch dog pulse WDC1 which is applied to the first watch dog timer 16.

The first watch dog timer 16 detects non-inversion of the first watch dog pulse WDC1 and changes its output signal from the high level to low level to indicate the occurrence of malfunction in the monitor program 14. As a result, the power supply to the throttle motor 20 is disabled to stop the motor rotation, resulting in stopping the electronic throttle control.

In response to an affirmative determination (Y) of step 320 indicative of the proper processing of the sub-routine A, on the contrary, the processing advances to step 325 to store in C1 a predetermined value Ks(B) indicative of entry into the sub-routine B. Thereafter, at step 330, the sub-routine B is called in and executed at step 330.

The engine control computer 4 then checks at step 335 whether C1 is equal to Ke(B), which is to be set at the time of ending the sub-routine B. The processing advances to step 350 in response to a negative determination (N) indicative of the malfunction in the monitor program 14, that is, improper processing order of the sub-routine B, without executing steps 340 and 345. That is, the first watch dog pulse WDC1 is not inverted.

The processing advances to step 340 in response to an affirmative determination (Y) at step 335. At step 340, the engine control computer 4 checks whether C3 is equal to a predetermined value Kp. In response to an affirmative determination (Y) at step 340 indicative of no change of C3 in the course of the above processing, that is, when the monitor program 14 is executed properly, the watch dog pulse WDC1 is inverted at step 345. Thus, the first watch dog timer 16 is enabled to detect no malfunction of the monitor program 14. In response to a negative determination (N) at step 340 indicative of the malfunction in the monitor program 14, the processing advances to step 350. That is, the watch dog pulse WDC1 is not inverted, so that the first watch dog timer 16 may detect the malfunction.

The engine control computer 4 finally stores in C3 a predetermined value Kp2 different from Kp, thus ending the monitor processing.

Figure 5:
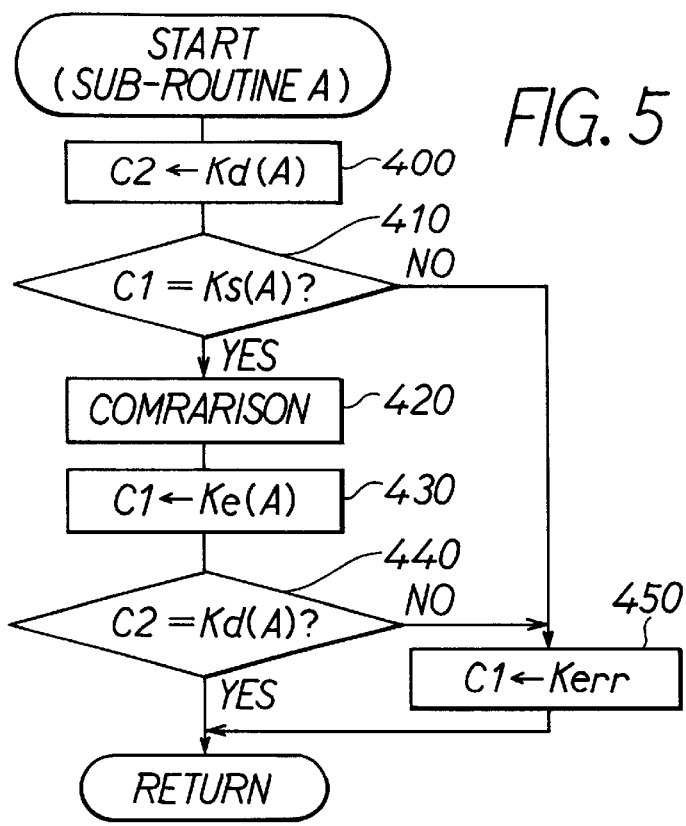
FIG. 5 is a flow diagram showing a sub-routine A of the monitor program.

The engine control computer 4 executes the processing of sub-routine A (step 315) as shown in FIG. 5.

First, at step 400, a predetermined value Kd(A) indicative of a start of the sub-routine A is stored in C2. C2 is a sub-routine entry/end check RAM used to check whether the plurality of sub-routines of the monitor program 14 are started and ended properly.

Next, at step 410, the engine control computer 4 checks whether C1 is equal to Ks(A). The processing advances to step 450 in response to a negative determination (N) indicative of the malfunction. A predetermined value Kerr is stored in C1 to indicate the occurrence of malfunction. The processing however advances to step 420 in response to an affirmative determination (Y) at step 400 indicative of no malfunction.

At step 420, the engine control computer 4 compares its result of calculation using its own data with its another result of calculation using the same data of the throttle control computer 6. For instance, a fuel injection amount calculated at step 110 (FIG. 2) from its own data of parameters (throttle position, accelerator position, etc.) is compared with another fuel injection amount calculated from the data of the same parameters (throttle position, accelerator position, etc.) received from the throttle control computer 6. If the two compared calculation results do not agree each other under the condition that no malfunction of the engine control computer 4 is detected by the second watch dog timer 8, the engine control computer 4 determines that the throttle control computer 6 is in malfunction. In this instance, the engine control computer 4 resets the throttle control computer 6 through the signal line 11.

At the following step 430, the predetermined value Ke(A) is stored in C1 to indicate the end of the sub-routine A. Then, at step 440, it is checked whether C2 is equal to Kd(A), that is, whether this processing has started properly form the beginning. The processing ends in response to an affirmative determination (Y), while it advances to step 450, in which Kerr indicative of the malfunction is stored in C1.

Figure 6:
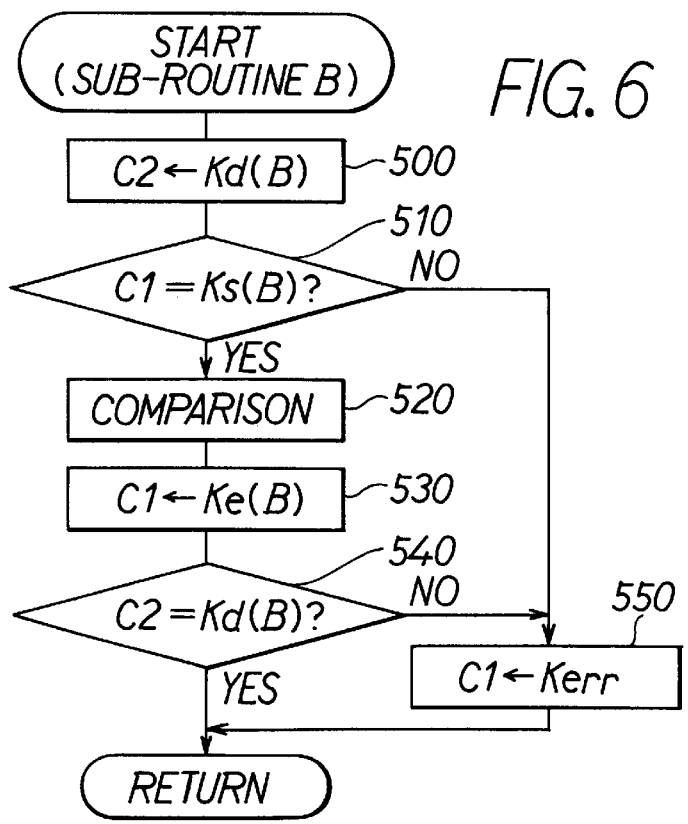
FIG. 6 is a flow diagram showing a sub-routine B of the monitor program.

The engine control computer 4 further executes the processing of sub-routine B (step 330) shown in FIG. 6 in the similar manner as that of sub-routine A.

First at step 500, a predetermined value Kd(B) is stored in C2 to indicate that the sub-routine B has started. At the next step 510, it is checked whether C1 is equal to Ks(B). In response to an affirmative determination (Y) indicative of no malfunction, the processing advances to step 520. In response to a negative determination (N) indicative of the malfunction, however, the processing advances to step 550 to store Kerr in C1.

At step 520, two results of calculations using the same data, one in the engine control computer 4 and the other in the throttle control computer 6, are compared. Then, a predetermined value Ke(B) is stored in C1 at step 530 to indicate that the sub-routine B has ended.

At step 540, it is checked whether C2 is equal to Kd (B). In response to an affirmative determination (Y) indicative of no malfunction, the processing ends. In response to a negative determination (N) indicative of the malfunction, on the contrary, the processing advances to step 550 to store Kerr in C1.

As described above, the engine control computer 4 executes the monitor program 14 and check whether the monitor program 14 is executed properly by using specific RAMs (C1, C2, C3). If it is not executed properly, inverting the watch dog pulse WDC1 is disabled to indicate the malfunction of the monitor program 14, that is, the monitor program 14 is not executed properly.

The non-inversion of the watch dog pulse WDC1 is detected by the first watch dog timer 16, which responsively produce the low level signal (L) to the AND gate 12. The AND gate 12 also produces the low level signal (L) indicative of the malfunction to turn off the motor relay 24, thus disabling the electronic throttle control by the throttle control computer 6. The low level signal (L) of the AND gate 12 is applied to the port P of the throttle control computer 6 after being inverted by the transistor 13. It is to be noted that the turning off of the motor relay 24 and the application of the low level signal (L) to the throttle control computer 6 after inversion occurs not only in response to the detection of the above malfunction of the monitor program 14 by the first watch dog timer 16 but also in response to the detection of the malfunction of the throttle control computer 6 by the monitor program 14.

Figure 7:
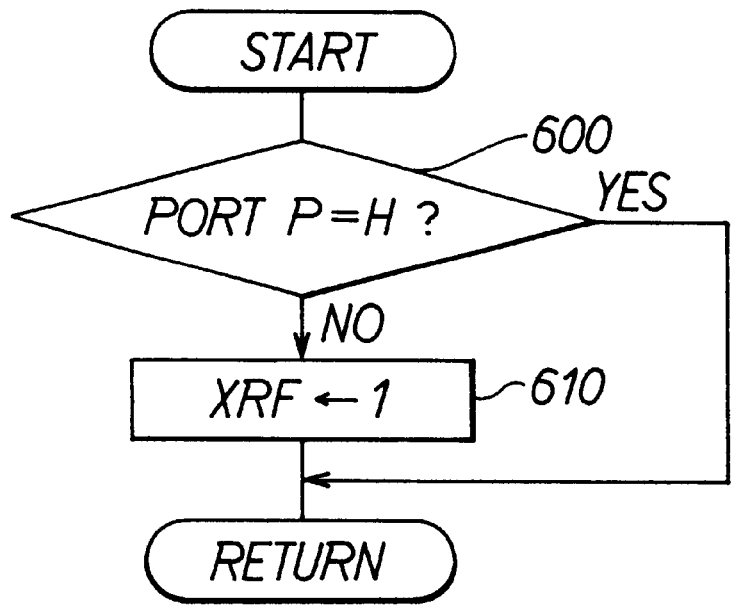
FIG. 7 is a flow diagram showing a processing executed by a throttle control computer based on a signal at a port P.
Figure 8:
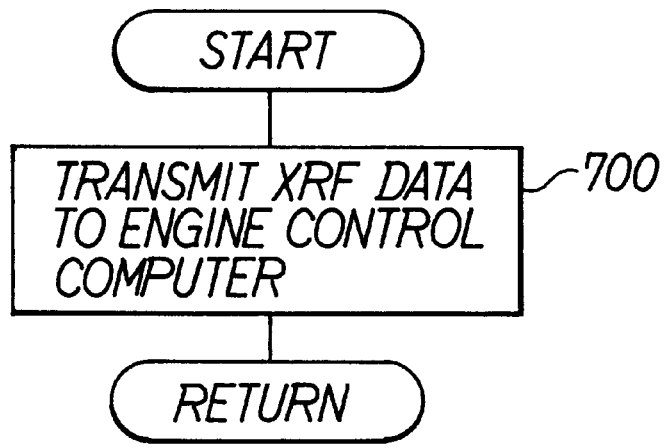
FIG. 8 is a flow diagram showing a communication processing executed by the throttle control computer based on the signal at the port P.

The throttle control computer 6 is programmed to execute a base routine shown in FIG. 7 and a timer routine shown in FIG. 8.

As shown in FIG. 7, the throttle control computer 6 first checks at step 600 whether the port P is at the high level (H) indicative of no malfunctions of the throttle control computer 6 and the monitor program 14 of the engine control computer 4. The processing ends in response to a positive determination (Y) indicative of no malfunction. The processing however advances to step 610 in response to a negative determination (N). At step 610, a flag XRF is set to 1 to indicate an occurrence of at least one of the malfunctions and turning off of the motor relay 24.

As shown in FIG. 8, the throttle control computer 6 transmits at step 700 the flag data XRF=1 to the engine control computer 4.

Figure 9:
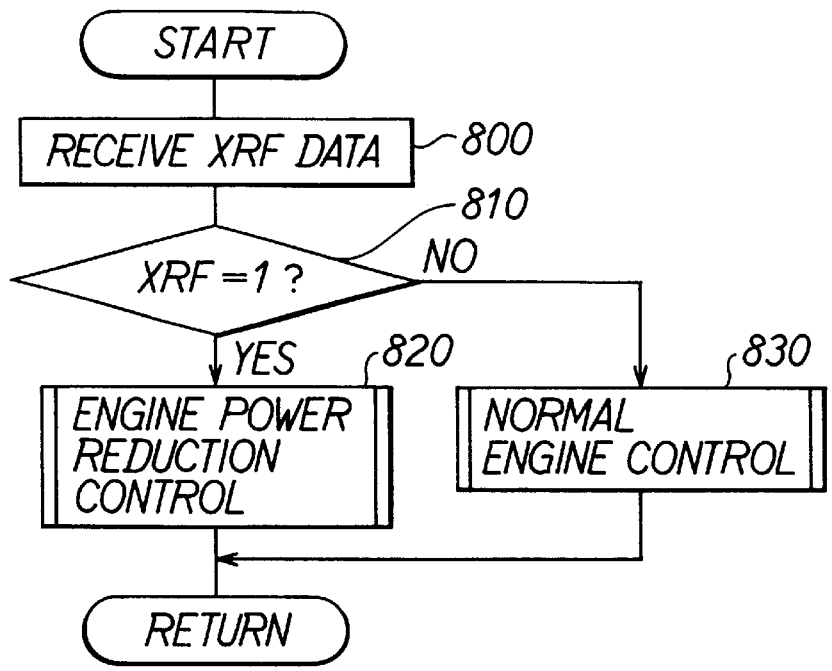
FIG. 9 is a flow diagram showing a processing executed by the engine control computer at the time of occurrence of malfunction in the throttle control computer.

Referring to FIG. 9, the engine control computer 4 receives the flag data XRF at step 800 from the throttle control computer 6. At the following step 810, it is checked whether this flag data XRF is 1. The processing advances to steps 820 and 830 in response to an affirmative determination (Y) and a negative determination (N) of step 810, respectively.

The engine control computer 4 controls air-fuel mixture combustion of the engine at step 820 to reduce engine power for a limp-home operation. For instance, the engine control computer 4 cuts off fuel supply to specific cylinders of the engine thereby to enable air-fuel mixture combustion only in the other cylinders, because the throttle control by the throttle control computer 6 is not possible. Alternatively, the engine control computer 4 may retard ignition timing to reduce the engine power. The throttle control computer 6 may be reset at this moment. Thus, the engine is maintained in operation to drive a vehicle with reduced power while the throttle is maintained inoperable.

The engine control computer 4 executes at step 830 the normal engine control in response to a negative determination (N) at step 810 indicative of no malfunction. It is to be noted that this routine may be executed at step 110 in FIG. 2.

The operation of the first watch dog timer 16 is checked during the main relay control period, that is, the during the period the engine is at rest and the power supply to the ECU 2 through the main relay 28 is maintained. This checking is made as follows by forcibly putting the first watch dog timer 16 into the malfunction condition and checking whether the motor relay 24 is turned off.

Figure 10:
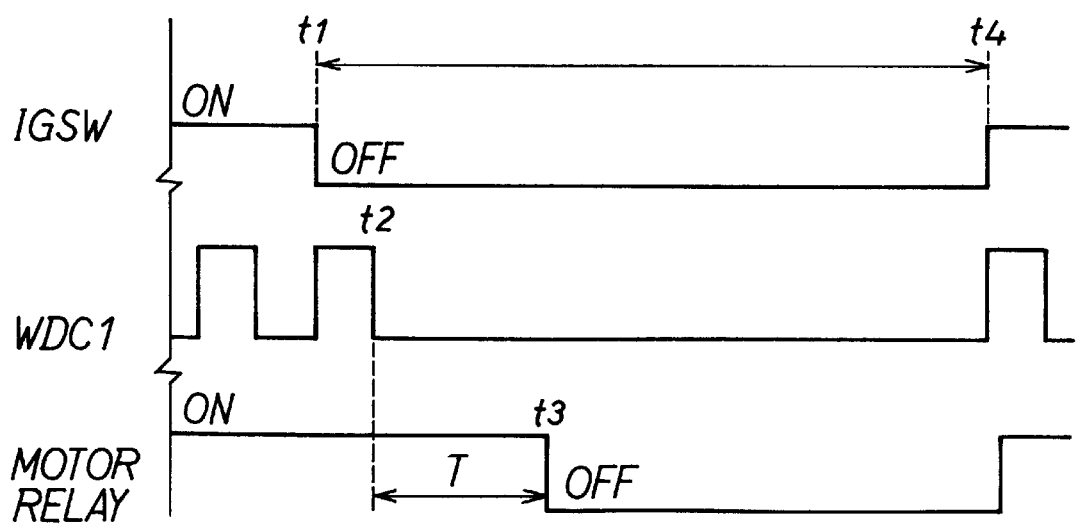
FIG. 10 is a timing diagram showing a check processing of the monitor program.

Specifically, as shown in FIG. 10, the ignition switch (IGSW) is turned off first at time t1. This causes the first watch dog pulse WDC1 to not be inverted any longer after time t2. At the following time t3 after a period of time T from time t2, the first watch dog timer 16 detects the malfunction and responsively turns off the motor relay 24. The motor relay 24 is maintained turned off as long as the ignition switch is maintained off. The turn-off condition of the motor relay 24 may be checked by monitoring the voltage supplied through the motor relay 24 or by monitoring the signal produced by a throttle position sensor which detects the throttle position.

When the ignition switch is turned on again at t4, the detection of malfunction is reset so that the first watch dog pulse WDC1 starts to repeat changing its output level. Thus, the first watch dog timer 16 returns to normal malfunction monitoring condition.

According to the above embodiment, the first watch dog timer 16 provided in addition to the second watch dog timer 8 exclusively checks execution of the monitor program 14. Therefore, even when the monitor program 14 fails to check the throttle control computer 6, the electronic throttle control by the throttle control computer 6 can be disabled by turning off the motor relay 24 through the first watch dog timer 16.

The detection of malfunction of the monitor program 14 is transmitted to the engine control computer 4 by using the flag data XRF from the throttle control computer 6. Therefore, the engine control computer 4 is enabled to ensure the limp-home operation of the engine.

As the first watch dog timer 16 is provided separately from the second watch dog timer 8 to detect only the malfunction of the monitor program 14, the engine control computer 4 is not reset entirely when only the monitor program 14 fails with the engine control program being operable properly. Thus, the limp-home operation is ensured by switching from the throttle control to the engine power reduction control.

When the malfunction occurs in the engine control computer 4, the engine control computer 4 is reset and its malfunction is transmitted to the throttle control computer 6. Thus, the required engine control unattainable by the engine control computer 4 may be attained by the throttle control computer 6 to the extent to ensure the limp-home operation of the engine.

Further, as the first watch dog timer 16 and the AND gate 12 are provided to directly control the motor relay 24, the engine control computer 4 need not be programmed to turn off the motor relay and to check the relay turn-off program.

In the event that the engine control computer 4 is programmed to execute the monitor program 14 in the base routine, the execution of the monitor program 14 will be delayed when many interrupts occur. However, this problem is eliminated, because the monitor program processing is executed as the timer interrupt routine as shown in FIG. 3.

The present invention having been described above with reference to one preferred embodiment may be implemented in many other ways without departing from the spirit of the invention.

What is claimed is:

1. An electronic control system comprising:
a first computer programmed to control a first object;
a second computer having a control program and programmed to control a second object by the control program, the second computer having a monitor program for checking a malfunction of the first computer; and
a program watching unit for detecting a malfunction of only the monitor program of the second computer,
wherein the program watching unit is connected to the first computer to apply a malfunction signal to the first computer upon detection of malfunction of the monitor program;
wherein the first computer is programmed to transmit to the second computer the malfunction signal applied from the program watching unit; and
wherein the second computer is programmed to change to a second object control mode in response to the malfunction signal transmitted from the first computer.

2. An electronic control system as in claim 1 further comprising:
a computer watching unit for detecting a malfunction of the second computer separately from the program watching unit and resetting the second computer upon detection of the malfunction of the second computer irrespective of an output of the program watching unit.

3. An electronic control system as in claim 1 wherein:
the monitor program of the second computer is stored separately from the control program; and
the second computer is programmed to execute the monitor program as an interrupt routine.

4. An electronic control system as in claim 1 wherein:
the second computer is programmed to produce watch dog pulses during execution of the monitor program; and
the program watching unit is a watch dog timer connected to the second computer to detect malfunction of only the monitor program in response to the watch dog pulses.

5. An electronic system comprising:
a first computer programmed to control a first object;
a second computer programmed to control a second object, the second computer having a monitor program for checking a malfunction of the first computer; and
a program watching unit for detecting a malfunction of the monitor program of the second computer, the first object is a motor for a throttle valve and
the second object is an engine.

6. An electronic control system as in claim 5 further comprising:
a computer watching unit for detecting a malfunction of the second computer separately from the program watching unit.

7. An electronic control system as in claim 5, wherein:
the monitor program of the second computer is stored separately from an engine control program; and
the second computer is programmed to execute the monitor program as an interrupt routine.

8. An electronic control system as in claim 5, wherein:
the program watching unit is connected to shut off a power supply to the motor upon detection of a malfunction of the monitor program, thereby disabling throttle control by the first computer through the motor.

9. An electronic control system as in claim 5, wherein:

the second computer is programmed to control the engine in a manner to reduce an engine power upon detection of the malfunction of the monitor program by the program watching unit.

10. An engine control system as in claim 5, wherein:

operation of the program watching unit is checked under a condition that the engine is at rest and the second computer is held operative.

11. An electronic control system as in claim 5, wherein:

the second computer is programmed to produce a watch dog pulse during execution of the monitor program; and the program watching unit is a watch dog timer connected to the second computer to detect the malfunction of the monitor program in response to watch dog pulses.

12. An electronic control system as in claim 11, wherein:

the program watching unit is connected to the first computer to apply a malfunction signal to the first computer upon detection of a malfunction of the monitor program;

the first computer is programmed to transmit to the second computer the malfunction signal applied from the program watching unit; and the second computer is programmed to change engine control mode to reduce engine power in response to the malfunction signal transmitted from the first computer.

13. A method of controlling an engine operation by a throttle control computer for a throttle valve and an engine control computer for an air-fuel mixture combustion, the method comprising:

monitoring an operation of the throttle control computer by executing a monitor program in the engine control computer, the monitoring producing a monitor output during execution of the monitor program;

checking execution of the monitor program in response to the monitor output to produce a malfunction output when a malfunction occurs in the monitor program; and disabling throttle control by the throttle control computer in response to the malfunction output.

14. A method as in claim 13, further comprising:

changing the engine control computer form a normal engine control mode to a power reduction control mode in response to the malfunction output.

15. A method as in claim 14, further comprising:

transmitting the malfunction output to the engine control computer through the throttle control computer.

16. A method as in claim 13, further comprising:

producing another monitor output from the engine control computer while the engine control computer is in operation;

checking the operation of the engine control computer in response to the another monitor output; and resetting the engine control computer when a malfunction is detected by the operation checking step.

17. A method as in claim 13, wherein:

the disabling shuts off a power supply to a throttle control motor which is connected to the throttle valve and controlled by the throttle control computer.

18. A method as in claim 13, further comprising:

executing an engine control program in the engine control computer provided separately from the monitor program; and executing the monitor program in the engine control computer as an interrupt to the engine control program.

19. A method as in claim 18, wherein:

the monitor program is executed at predetermined time intervals.

20. An electronic control system comprising:

a computer having an object control program and programmed to control a controlled object, the computer having a monitor program for checking a malfunction of another control system; and a program watching unit for detecting a malfunction of only the monitor program of the computer, wherein the controlled object is a motor for a throttle valve; and wherein the another control system is one of fuel supply and ignition of the engine.

21. An electronic control system as in claim 20, further comprising:

a computer watching unit for detecting a malfunction of the computer separately from the program watching unit, wherein the computer is enabled to execute the object control program when only the malfunction of the monitor program is detected by the program watching unit, and the computer is disabled to execute both of the programs when the malfunction of the computer is detected by the computer watching unit.

22. A multi-computer electronic control system comprising:

a first computer having at least one monitoring program executed therein and generating first and second recurrent watch dog signals respectively indicative of normal and abnormal operation of: (1) a second interconnected computer of the system, and (2) the monitoring program executed in said first computer; and first and second watch dog timers connected to respectively receive said first and second watch dog signals, to detect said abnormal operations and to feed back corresponding control signals to said first and second computers.

23. A multi-computer electronic control method comprising:

executing at least one monitoring program in a first computer and generating first and second recurrent watch dog signals respectively indicative of normal and abnormal operation of: (1) a second inter-connected computer of the system, and (2) the monitoring program executed in said first computer; and using said first and second watch dog signals to detect said abnormal operations and to feed back corresponding control signals to said first and second computers.

* * * * *